(No Model.) 2 Sheets—Sheet 1.
S. H. SHORT & J. W. NESMITH.
ELECTRICAL RAILWAY.
No. 362,323. Patented May 3, 1887.
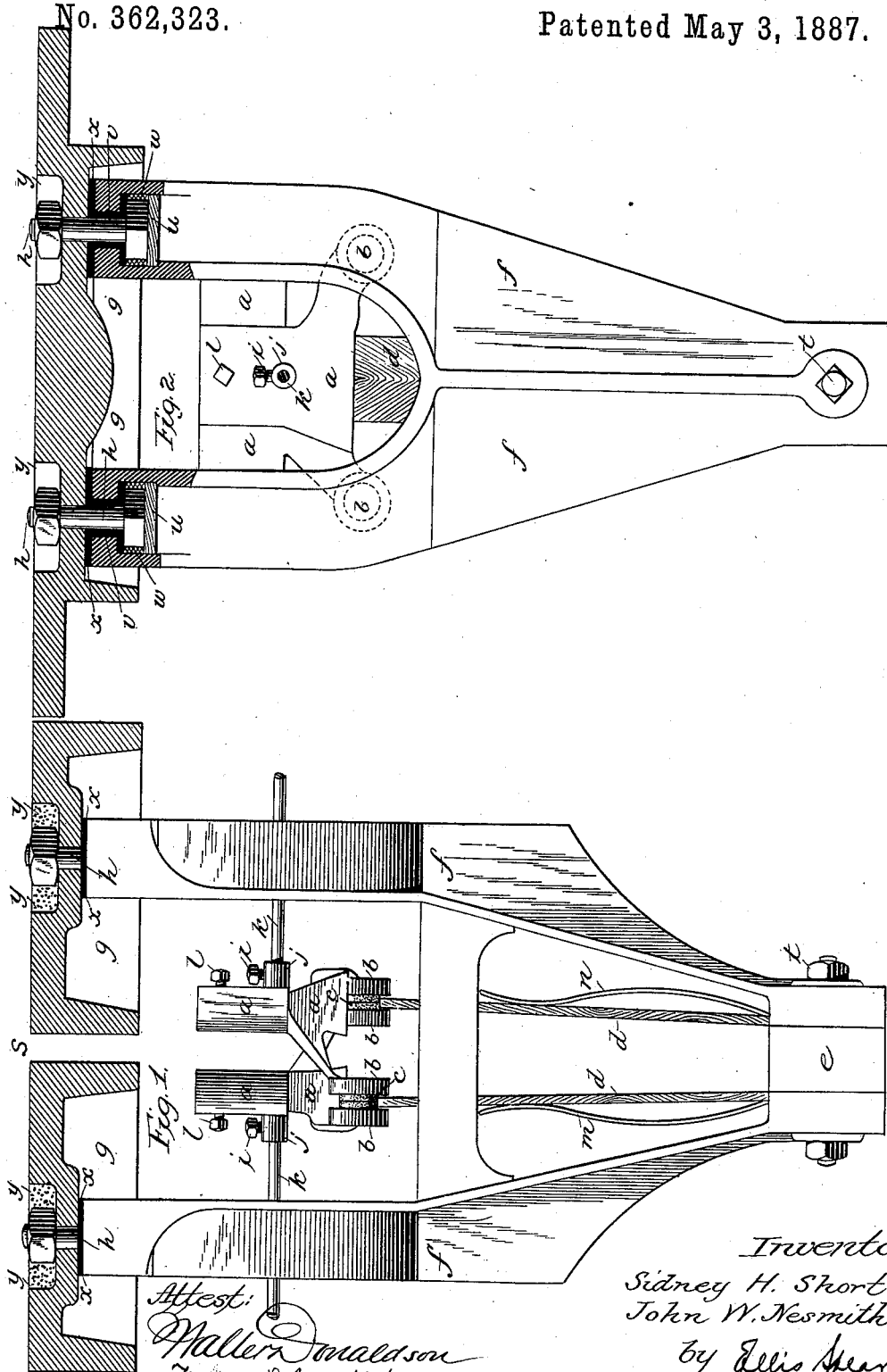
Attest:
Waller Donaldson
Frank L. Middleton
Inventors
Sidney H. Short
John W. Nesmith
by Ellis Spear
Atty.

(No Model.) 2 Sheets—Sheet 2.
S. H. SHORT & J. W. NESMITH.
ELECTRICAL RAILWAY.
No. 362,323. Patented May 3, 1887.
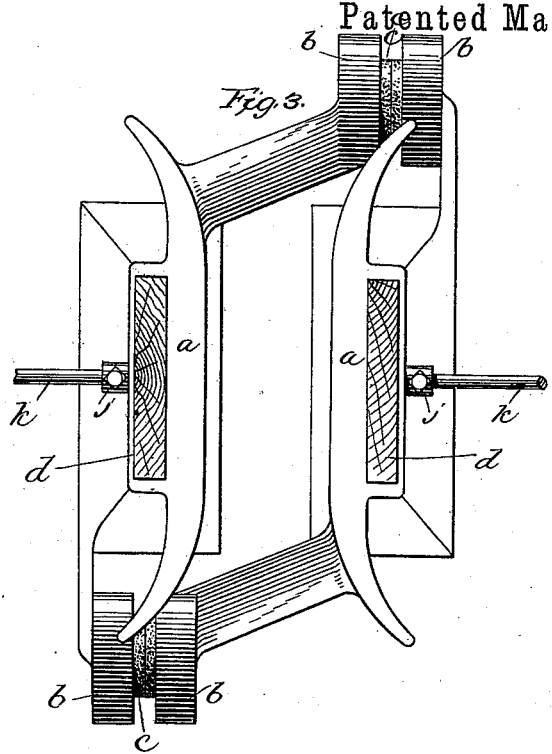
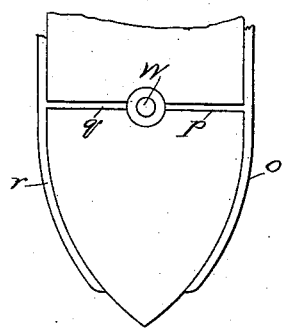

UNITED STATES PATENT OFFICE.

SIDNEY H. SHORT AND JOHN W. NESMITH, OF DENVER, COLORADO.

ELECTRICAL RAILWAY.

SPECIFICATION forming part of Letters Patent No. 362,323, dated May 3, 1887.

Application filed August 9, 1886. Serial No. 210,429. (No model.)

*To all whom it may concern:*

Be it known that we, SIDNEY H. SHORT and JOHN W. NESMITH, of Denver, in the county of Arapahoe and State of Colorado, have invented a new and useful Improvement in Electrical Railways; and we do hereby declare that the following is a full, clear, and exact description of the same.

The object of this invention is to provide a simple and efficient mechanism to be used in connection with an electric-railway system in which only a single conductor cut into sections is used.

The apparatus herein described is the bridging device between the ends of the sections, and is arranged to automatically close the circuit, as described in an application filed by us on the 27th of November, 1885, Serial No. 184,112.

This apparatus we will call a "spring-jack" or "circuit-closer." It is so constructed that when the current-gatherer, which is carried by the car or moving electric locomotive, passes through it, the current which is passing over the wire in connection with which they are placed is diverted therefrom and caused to pass through a moving loop carried by the vehicle and made to operate an electric motor or other electric receptive device. The current-gatherer, together with the spring-jack, are so arranged that the current of electricity is continually diverted through the translating-loop, in the circuit of which loop is included the electric motor for propelling the car, locomotive, or other vehicle.

In the drawings, Figures 1 and 2 represent the spring-jack partly in section and partly in elevation, the views being at right angles to each other. Fig. 3 shows details of the contact-plates more fully. Fig. 4 shows the end of the current-gatherer, which is made to move between the contact-plates, thus to force them apart.

In Figs. 1 and 2, $g\ g$ are iron plates fastened in any convenient way between the rails of a tramway. Between the plates $g$ and $g$, Fig. 1, is a slot, S, which forms a part of the slot which extends along the entire line. To these plates, and hanging down into the conduit below, is bolted a frame-work of iron, $f\ e\ f$, by means of the bolts $h\ h$. These bolts are insulated from the frame by the insulating material $x\ v\ w\ u$, and the cavity in the plates $g\ g$ around the heads of these bolts at $y$ is filled with some material impervious to water, so that a good insulated joint is made between the frame $ff$ and the plates $g\ g$. Clamped between the block $e$ and the pieces $ff$ are two springs, $d\ d$, of some suitable insulating material; also, two auxiliary springs of steel, $m$ and $n$, as shown in the drawings. At the top of the two springs $d\ d$ are the contact curved plates $a$ and $a$, one on each spring. These contact curved plates each carry two arms, as shown at $b\ b$, Fig. 3. These arms are provided at their ends with large carbon contact-faces, as shown at $c$, same figure. These contact-plates are also provided with binding-posts $j\ j$, to receive the ends of the sectional conductor $k\ k$. When two of these curved plates, $a\ a$, are put in the position shown in the drawings, the current passes from the conductor $k$ on one side, through the arm $b$, carbons $c$, to arm $b$ on the other plate, and out at $k$ on the other side; but when the current-gatherer, (Fig. 4,) is made to pass into the space between $a$ and $a$ the contact at $c\ c$ will be broken, and the only path left for the current will be through $o\ p\ q\ r$. On its way it does work at $w$, which may be at any point in the loop in some electrical translating device, as a motor. These curved plates $a\ a$ are provided with an insulating-bill at the bottom to shed water; also, with means for holding the plates securely to the springs $d\ d$. The springs $d\ d$ and contact-plates $a\ a$ are carefully varnished with shellac and paraffine, and every precaution taken to make them water-proof.

The springs $m$ and $n$, of steel, are to provide for any weakness in the insulating-springs $d\ d$.

We are aware that it has been suggested to connect the sections of a telegraphic wire by spring-seated contact-arms and an insulated plate intermediate of the same, with a space between the upper ends of the arms for the passage of a shunting device, and we do not broadly claim this subject-matter.

We claim as our invention—

1. The combination, with an electric-railway system having a single sectional conductor, of a circuit-closer composed of two parts, with their faces in contact at one point, bridging the space between the sections, each of the parts being suitably supported, and a channel for the passage of the current-gatherer carried upon the car, the said gatherer forcing the portions apart in its passage between the same and diverting the current to the electric motor or other vehicle, substantially as described.

2. In combination with an electric-railway system having a single sectional conductor, a spring-jack or circuit-closer formed in two parts, each supported upon an independent spring, so that the faces of the parts are in contact with each other, curved plates $a\,a$, having a passage between them, through which the point of the current-gatherer on the car is adapted to pass, the said gatherer in its passage through between the plates forcing them apart by reason of the spring-supports and diverting the current to the electric motor, substantially as described.

3. In an electric-railway system having a single sectional conductor, a spring-jack or circuit-closer composed of two parts, each mounted upon spring-supports and each part consisting of a suitable base secured to the end of the support, with laterally-extending arms at opposite ends, said arms having contact-faces adapted to contact-faces upon the parts opposite, and the projecting curved plates $a\,a$, with a space between them for the passage of the current-gatherer, substantially as described.

4. The combination, in an electric-railway system having a single sectional conductor, of a spring-jack made in two parts arranged side by side, with faces on each in contact, each part being supported upon an independent insulated spring-support arranged side by side at the ends of the section, whereby the parts are kept in contact or restored to contact when the current is diverted by the passage of the current-gatherer, substantially as described.

5. The combination, in an electric-railway system having a single sectional conductor, of a spring-jack made in two parts mounted upon insulated springs, with supplemental springs for aiding in keeping the two parts in contact or restoring them to contact when the current is diverted by the passage of the current-gatherer between them, substantially as described.

6. The combination, with the described electric-railway system, of a spring-jack or circuit-closer adapted to bridge the space between the sections, consisting of two parts mounted upon independent spring-supports composed of insulating material, and the supporting-frame having an insulating connection at its upper end, substantially as described.

In testimony whereof we have signed our names to this specification in the presence of two subscribing witnesses.

SIDNEY H. SHORT.
JOHN W. NESMITH.

Witnesses:
RODNEY CURTIS,
WM. G. EVANS.